United States Patent
Wang et al.

(10) Patent No.: US 6,401,457 B1
(45) Date of Patent: Jun. 11, 2002

(54) SYSTEM FOR ESTIMATING TURBOCHARGER COMPRESSOR OUTLET TEMPERATURE

(75) Inventors: Yue Yun Wang; John M. Mulloy, both of Columbus; Mark W. Pyclik, Bloomington, all of IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/774,959

(22) Filed: Jan. 31, 2001

(51) Int. Cl.$^7$ ................................................ F02B 29/04
(52) U.S. Cl. ...................... 60/599; 60/602; 60/605.1; 60/280; 60/605.2; 123/568.21; 123/568.22; 73/118.2
(58) Field of Search ................... 60/599, 602, 606, 60/608, 600, 601, 603, 605.2, 280; 123/562, 564, 568.21, 568.22; 73/118.2

(56) References Cited

U.S. PATENT DOCUMENTS

| | | |
|---|---|---|
| 3,872,835 A | 3/1975 | Deutschmann |
| 4,204,401 A | 5/1980 | Earnest |
| 4,271,664 A | 6/1981 | Earnest |
| 4,546,742 A | 10/1985 | Sturges |
| 4,616,481 A | 10/1986 | Melchior et al. |
| 4,794,759 A | 1/1989 | Lyon |
| 5,379,584 A | 1/1995 | Windish et al. |
| 5,397,181 A | 3/1995 | McNulty |
| 5,440,879 A * | 8/1995 | Dellora ........................ 60/602 |
| 5,526,266 A * | 6/1996 | Rutan et al. ................... 60/602 |
| 5,628,185 A | 5/1997 | Rowe |
| 5,680,763 A * | 10/1997 | Unland et al. ................. 60/602 |
| 5,829,254 A * | 11/1998 | Hayashi et al. ............... 60/602 |
| 6,050,093 A * | 4/2000 | Daudel et al. ................. 60/602 |
| 6,067,800 A * | 5/2000 | Kolmanovky et al. ........ 60/602 |
| 6,152,118 A * | 11/2000 | Sasaki et al. ............ 123/568.21 |
| 6,256,992 B1 * | 7/2001 | Lewis, Jr. et al. ............ 60/603 |
| 6,263,673 B1 * | 7/2001 | Schmidt et al. ............... 60/602 |

* cited by examiner

Primary Examiner—Thomas Denion
Assistant Examiner—Thai-Ba Trieu
(74) Attorney, Agent, or Firm—Barnes & Thornburg

(57) ABSTRACT

A system for estimating turbocharger compressor outlet temperature includes an engine controller responsive to any two of corrected turbocharger speed, corrected fresh mass air flow and turbocharger compressor pressure ratio (compressor outlet pressure/compressor inlet pressure) to compute compressor outlet temperature based on a corresponding compressor outlet temperature model.

22 Claims, 10 Drawing Sheets

SYSTEM FOR ESTIMATING TURBOCHARGER COMPRESSOR OUTLET TEMPERATURE

FIELD OF THE INVENTION

The present invention relates generally to systems for determining the outlet temperature of a turbocharger compressor for an internal combustion engine, and more specifically to such a system for estimating compressor outlet temperatures as a function of one or more engine operating conditions.

BACKGROUND OF THE INVENTION

When combustion occurs in an environment with excess oxygen, peak combustion temperatures increase which leads to the formation of unwanted emissions, such as oxides of nitrogen ($NO_X$). This problem is aggravated through the use of turbocharger machinery operable to increase the mass of fresh air flow, and hence increase the concentrations of oxygen and nitrogen present in the combustion chamber when temperatures are high during or after the combustion event.

One known technique for reducing unwanted emissions such as $NO_X$ involves introducing chemically inert gases into the fresh air flow stream for subsequent combustion. By thusly reducing the oxygen concentration of the resulting charge to be combusted, the fuel burns slower and peak combustion temperatures are accordingly reduced, thereby lowering the production of $NO_X$. In an internal combustion engine environment, such chemically inert gases are readily abundant in the form of exhaust gases, and one known method for achieving the foregoing result is through the use of a so-called Exhaust Gas Recirculation (EGR) system operable to controllably introduce (i.e., recirculate) exhaust gas from the exhaust manifold into the fresh air stream flowing to the intake manifold.

EGR operation is typically not required under all engine operating conditions, and known EGR systems accordingly include a valve, commonly referred to as an EGR valve, for controllably introducing exhaust gas to the intake manifold. Through the use of an on-board microprocessor, control of the EGR valve is typically accomplished as a function of information supplied by a number of engine operational sensors.

In a turbocharged engine, a compressor component of the turbocharger typically supplies fresh air to the intake manifold of the engine via an intake conduit. An EGR system implemented in such a turbocharged engine supplies controlled amounts of exhaust gas to the intake manifold via the same intake conduit. In order to maintain the exhaust pressure above the intake manifold pressure to ensure positive EGR flow, turbochargers in EGR-based engines must typically operate at higher rotational speeds than in non-EGR-based engines. These high rotational speeds directly result in increased turbocharger outlet temperatures, and excessive heating of the compressor caused thereby could result in melting of the compressor housing and/or damage to the compressor wheel.

In turbocharged, EGR engines of the foregoing type, care must accordingly be taken to avoid generating excessive compressor outlet temperatures. However, in order to control and manage compressor outlet temperatures, it is generally necessary to have knowledge of current compressor outlet temperature conditions. Unfortunately, no production temperature sensors are currently known that can withstand the high temperatures typically encountered in the compressor outlet environment. What is therefore needed is system for accurately estimating compressor outlet temperature, so that the compressor outlet temperature can be maintained within a safe operating temperature range.

SUMMARY OF THE INVENTION

The foregoing shortcomings of the prior art are addressed by the present invention. In accordance with one aspect of the present invention, a system for estimating turbocharger compressor outlet temperature comprises a turbocharger having a compressor defining a compressor inlet and a compressor outlet fluidly coupled to an intake manifold of an internal combustion engine, a turbocharger speed sensor producing a turbocharger speed signal indicative of turbocharger rotational speed, means for determining air pressure within the compressor outlet and producing a first pressure signal corresponding thereto, a compressor inlet pressure sensor sensing air pressure within the compressor inlet and producing a second pressure signal corresponding thereto, means for determining a mass flow of fresh air entering the compressor inlet and producing a mass air flow signal corresponding thereto, and a control circuit computing a pressure ratio as a ratio of the first and second pressure signals, the control circuit estimating a temperature of the compressor outlet as a function of any two of the turbocharger speed signal, the mass air flow signal and the pressure ratio.

In accordance with another aspect of the present invention, a system for estimating turbocharger compressor outlet temperature comprises a turbocharger having a compressor defining a compressor inlet and a compressor outlet fluidly coupled to an intake manifold of an internal combustion engine, a turbocharger speed sensor producing a turbocharger speed signal indicative of turbocharger rotational speed, means for determining a mass flow of fresh air entering the compressor inlet and producing a mass air flow signal corresponding thereto, and a control circuit estimating a temperature of the compressor outlet as a function of the turbocharger speed signal and the mass air flow signal.

In accordance with yet another aspect of the present invention, a system for estimating turbocharger compressor outlet temperature comprises a turbocharger having a compressor defining a compressor inlet and a compressor outlet fluidly coupled to an intake manifold of an internal combustion engine, a turbocharger speed sensor producing a turbocharger speed signal indicative of turbocharger rotational speed, means for determining air pressure within the compressor outlet and producing first pressure signal corresponding thereto, a compressor inlet pressure sensor sensing air pressure within the compressor inlet and producing a second pressure signal corresponding thereto, and a control circuit computing a pressure ratio as a ratio of the first and second pressure signals, the control circuit estimating a temperature of the compressor outlet as a function of the turbocharger speed signal and the pressure ratio.

In accordance with still another aspect of the present invention, a system for estimating turbocharger compressor outlet temperature comprises a turbocharger having a compressor defining a compressor inlet and a compressor outlet fluidly coupled to an intake manifold of an internal combustion engine, means for determining a mass of fresh air entering the compressor inlet and producing a mass air flow signal corresponding thereto, means for determining air pressure within the compressor outlet and producing a first pressure signal corresponding thereto, a compressor inlet pressure sensor sensing air pressure within the compressor inlet and producing a second pressure signal corresponding thereto, and a control circuit computing a pressure ratio as a ratio of the first and second pressure signals, the control circuit estimating a temperature of the compressor outlet as a function of the mass air flow signal and the pressure ratio.

One object of the present invention is to provide a system and method for estimating turbocharger compressor outlet temperature.

Another object of the present invention is to provide a model-based system for estimating turbocharger compressor outlet temperature.

Yet another object of the present invention is to provide a system and method for controlling turbocharger compressor outlet temperature to limit the maximum outlet temperature to a predefined threshold temperature.

Still another object of the present invention is to provide system for achieving such control by modulating the swallowing capacity of the turbocharger turbine.

These and other objects of the present invention will become more apparent from the following description of the preferred embodiments.

DESCRIPTION OF THE PREFERRED EMBODIMENTS

Figure 1:
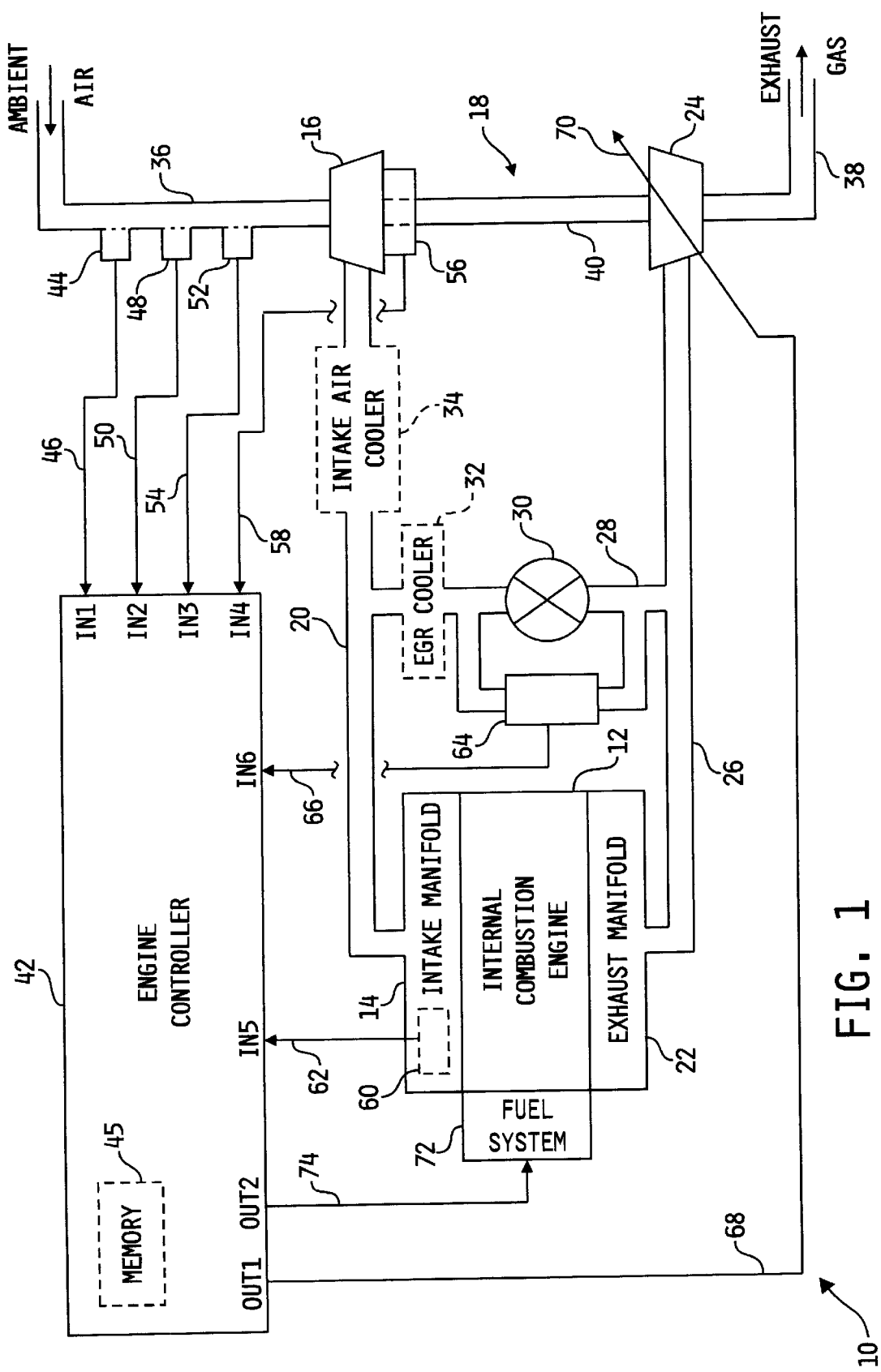
FIG. 1 is a diagrammatic illustration of one preferred embodiment of a system for estimating and controlling turbocharger compressor outlet temperature, in accordance with the present invention.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, one preferred embodiment of a system 10 for estimating and controlling turbocharger compressor outlet temperature, in accordance with the present invention, is shown. System 10 includes an internal combustion engine 12 having an intake manifold 14 fluidly coupled to an outlet of a compressor 16 of a turbocharger 18 via an intake conduit 20, wherein the compressor 16 includes a compressor inlet coupled to an intake conduit 36 for receiving fresh air therefrom. Optionally, as shown in phantom in FIG. 1, system 10 may include an intake air cooler 34 of known construction disposed in line with intake conduit 20 between the turbocharger compressor 16 and the intake manifold 14. The turbocharger compressor 16 is mechanically coupled to a turbocharger turbine 24 via a drive shaft 40, wherein turbine 24 includes a turbine inlet fluidly coupled to an exhaust manifold 22 of engine 12 via an exhaust conduit 26, and further includes a turbine outlet fluidly coupled to ambient via an exhaust conduit 38. An EGR valve 30 is disposed in line with an EGR conduit 28 disposed in fluid communication with the intake conduit 20 and the exhaust conduit 26, and an EGR cooler 32 of known construction may optionally be disposed in line with EGR conduit 28 between EGR valve 30 and intake conduit 20 as shown in phantom in FIG. 1.

System 10 includes an engine controller 42 that is preferably microprocessor-based and is generally operable to control and manage the overall operation of engine 12. Engine controller 42 includes a memory unit 45 as well as a number of inputs and outputs for interfacing with various sensors and systems coupled to engine 12. Controller 42, in one embodiment, may be a known control unit sometimes referred to as an electronic or engine control module (ECM), electronic or engine control unit (ECU) or the like, or may alternatively be a control circuit capable of operation as will be described hereinafter. In any case, engine controller 42 preferably includes one or more control algorithms, as will be described in greater detail hereinafter, for estimating and controlling the outlet temperature of the turbocharger compressor 16 based on input signals provided by a number of actual and/or virtual sensors.

Engine controller 42 includes a number of inputs for receiving signals from various sensors or sensing systems associated with system 10. For example, system 10 includes a compressor inlet temperature sensor 44 that is preferably disposed in fluid communication with intake conduit 36 and electrically connected to an input (IN1) of engine controller 42 via signal path 46. Sensor 44 may be of known construction and is generally operable to produce a compressor inlet temperature signal (CIT) on signal path 46 that is indicative of the temperature of ambient air entering the inlet of compressor 16 (i.e., entering the intake conduit 36). It is to be understood that for the purposes of the present invention, sensor 44 need not be disposed in fluid communication with intake conduit 36 and may instead be positioned in any convenient location relative to system 10 as long as sensor 44 is operable to produce a signal on signal path 46 indicative of the temperature of fresh ambient air.

System 10 further includes a compressor inlet pressure sensor 48 that is preferably disposed in fluid communication with intake conduit 36 and electrically connected to an input (IN2) of engine controller 42 via signal path 50. Sensor 48 may be of known construction and is generally operable to produce a compressor inlet pressure signal (CIP) on signal path 50 that is indicative of the pressure of ambient air entering the inlet of compressor 16 (i.e., entering intake conduit 36). It is to be understood that for the purposes of the present invention, sensor 48 need not be disposed in fluid communication with intake conduit 36 and may instead be positioned in any convenient location relative to system 10 as long as sensor 48 is operable to produce a signal on signal path 50 indicative of the pressure of ambient air.

System 10 further includes a mass air flow sensor 52 that is preferably disposed in fluid communication with intake conduit 36 and electrically connected to an input (IN3) of engine controller 42 via signal path 54. Sensor 52 may be of known construction and is generally operable to produce a mass air flow signal (MAF) on signal path 54 that is indicative of the mass flow of fresh (ambient) air entering the inlet of the compressor 16 (i.e., entering intake conduit 36). It is to be understood that for the purposes of the present invention, system 10 need not include a physical mass air flow sensor 52, and the engine controller 42 may instead include a control algorithm operable to estimate the mass flow of fresh air entering the inlet of compressor 16. While the present invention contemplates that the engine controller 42 may include any one or more known control algorithms for estimating the mass flow of fresh air entering the inlet of compressor 16, one such control algorithm particularly suited for use with the present invention will be described in detail hereinafter with respect to FIGS. 3A–3C.

System 10 further includes a turbocharger speed sensor 56 that is preferably disposed about, or in proximity with, the turbocharger drive shaft 40 and electrically connected to an input (IN4) of engine controller 42 via signal path 58. Sensor 56 may be of known construction and is generally operable to produce a turbocharger speed signal (TS) on signal path 56 that is indicative of the rotational speed of the turbocharger drive shaft 40. In one embodiment, sensor 56 is a variable reluctance sensor operable to determine turbocharger rotational speed by sensing passage thereby of one or more detectable structures formed on shaft 40. Alternatively, turbocharger speed sensor 56 may be any other known sensor operable as just described and suitably located relative to turbocharger drive shaft 40.

System 10 further includes an intake manifold pressure sensor 60 that is preferably disposed in fluid communication with intake manifold 14 and electrically connected to an input (IN5) of engine controller 42 via signal path 62. Sensor 60 may be of known construction and is generally operable to produce an intake manifold pressure signal (IMP) on signal path 62 that is indicative of the pressure within intake manifold 14.

System 10 further includes an EGR differential pressure sensor 64 that is preferably disposed in fluid communication with EGR conduit 30 on either side of the EGR valve 30 or other flow restriction structure and electrically connected to an input (IN6) of engine controller 42 via signal path 66. Sensor 64 may be of known construction and is generally operable to produce a differential pressure signal ($\Delta P$) on signal path 66 that is indicative of the differential pressure across valve 30, and therefore indicative of the pressure of the exhaust gas flowing from the exhaust conduit 26 to the intake conduit 20 (i.e., EGR pressure).

Engine controller 42 also includes a number of outputs for controlling one or more engine control mechanism associated with engine 12 and/or system 10. For example, as is known in the art, engine controller 42 is responsive to a number of input signals including, for example, engine speed, torque request, and the like, to determine a current fueling command value. This commanded fueling value is typically converted by engine controller 42 to a fueling signal (FS) which is provided to a fuel system 72 of engine 12 via signal path 74 electrically connected to output OUT1 of engine controller 42.

Engine controller 42 also includes at least one output for controlling turbocharger swallowing capacity and/or efficiency, wherein the term "turbocharger swallowing capacity" is defined for purposes of the present invention as the gas flow capacity of the turbocharger turbine 24. For example, as illustrated in FIG. 1, output OUT2 of engine controller 42 is electrically connected to a turbocharger swallowing capacity control mechanism 70 via signal path 68, wherein the turbocharger swallowing capacity control mechanism 70 is responsive to one or more turbocharger control signals to modify the swallowing capacity of turbocharger 18.

Figure 2A:
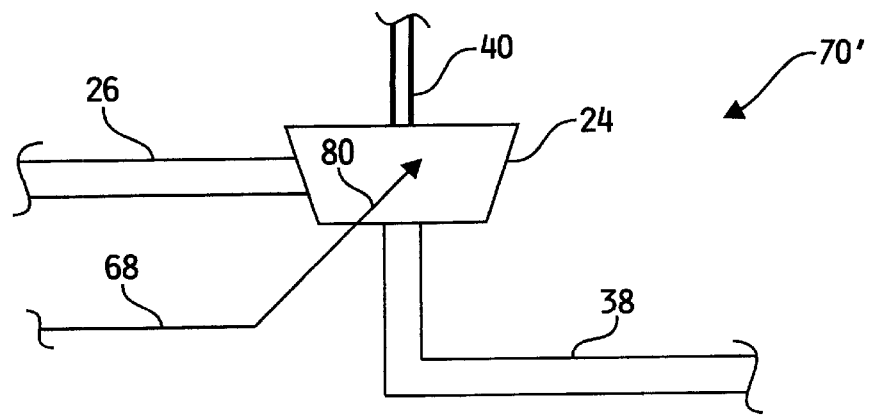
FIG. 2A is a diagrammatic illustration of one embodiment of a mechanism for controlling the swallowing capacity/efficiency of the turbocharger of FIG. 1.
Figure 2B:
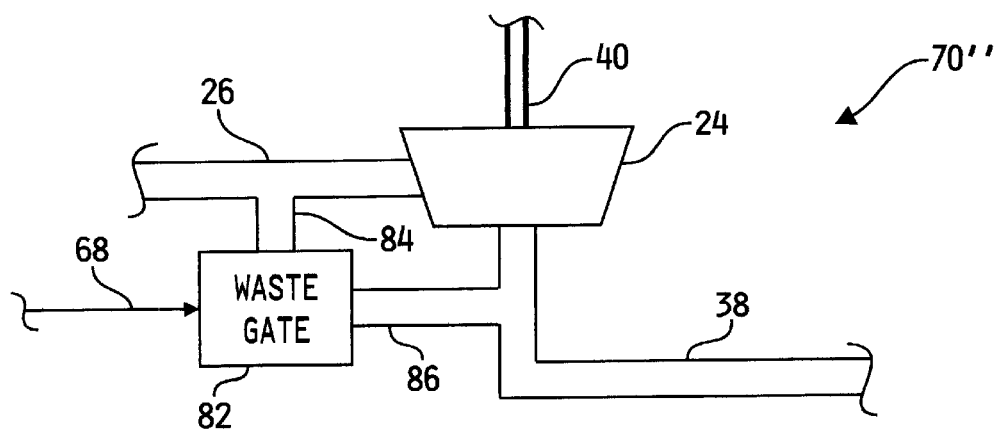
FIG. 2B is a diagrammatic illustration of another embodiment of a mechanism for controlling the swallowing capacity/efficiency of the turbocharger of FIG. 1.
Figure 2C:
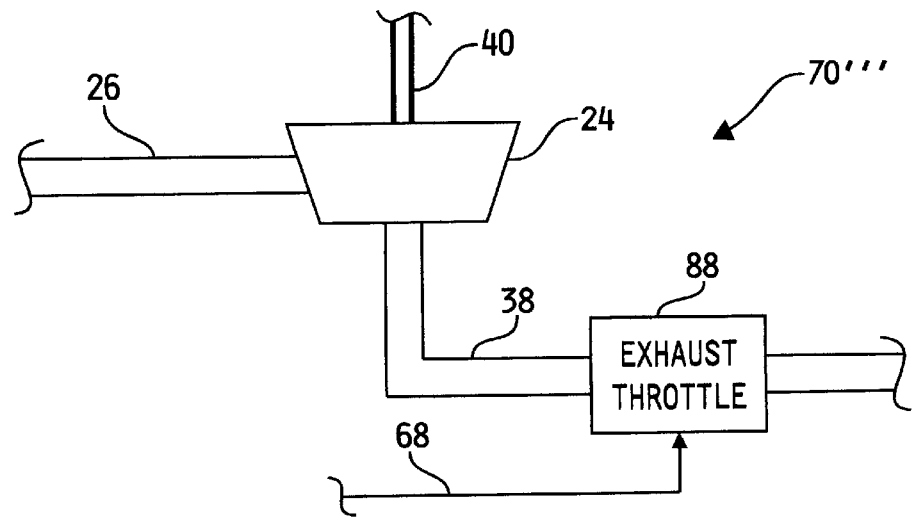
FIG. 2C is a diagrammatic illustration of yet another embodiment of a mechanism for controlling the swallowing capacity/efficiency of the turbocharger of FIG. 1.

In general, the present invention contemplates controlling the swallowing capacity and efficiency of the turbocharger 18 via one or more various control mechanisms 70 under the direction of engine controller 42, and exemplary embodiments of some such mechanisms are illustrated in FIGS. 2A–2C. For example, referring to FIG. 2A, one particular turbocharger swallowing capacity control mechanism embodiment 70' includes a known electronically controllable variable geometry turbocharger turbine 24 responsive to the turbocharger control signal on signal path 68 to establish a corresponding turbine geometry as illustrated in FIG. 2A by signal line 80. The effective flow area of the turbocharger turbine 24 is defined by the turbine geometry which, in turn, defines the exhaust gas flow capacity or turbine 24 as is known in the art.

Referring to FIG. 2B, another turbocharger swallowing capacity control mechanism embodiment 70" is shown and includes a wastegate 82 of known construction having one end fluidly coupled to exhaust conduit 26 via conduit 84 and an opposite end fluidly coupled to exhaust conduit 38 via conduit 86. In this embodiment, wastegate 82 is responsive to the turbocharger control signal on signal path 68 to establish a corresponding flow area therethrough. By diverting exhaust gas flowing through exhaust conduit 26 away from the inlet of turbine 24 toward exhaust conduit 38, the swallowing capacity of the turbocharger turbine 24 may thus be modified via appropriate control of wastegate 82.

Referring to FIG. 2C, yet another turbocharger swallowing capacity control mechanism embodiment 70''' is shown and includes an exhaust throttle 88 of known construction and disposed in line with exhaust conduit 38. In this embodiment, exhaust throttle 88 is responsive to the turbocharger control signal on signal path 68 to establish a corresponding flow area therethrough. By restricting the flow of exhaust gas through exhaust conduit 38, the swallowing capacity of the turbocharger turbine 24 may thus be modified via appropriate control of exhaust throttle 88.

It is to be understood that while different turbocharger swallowing capacity control mechanisms have been separately illustrated and described with respect to FIGS. 2A–2C, the present invention contemplates using any one or combination of the variable geometry turbocharger 80, wastegate 82 and exhaust throttle 88 structures to modify turbocharger swallowing capacity. In embodiments including wastegate 82 and exhaust throttle 88, those skilled in the art will recognize that the wastegate outlet conduit 86 may be fluidly coupled to exhaust conduit 38 either upstream or downstream end of exhaust throttle 88.

Figure 3A:
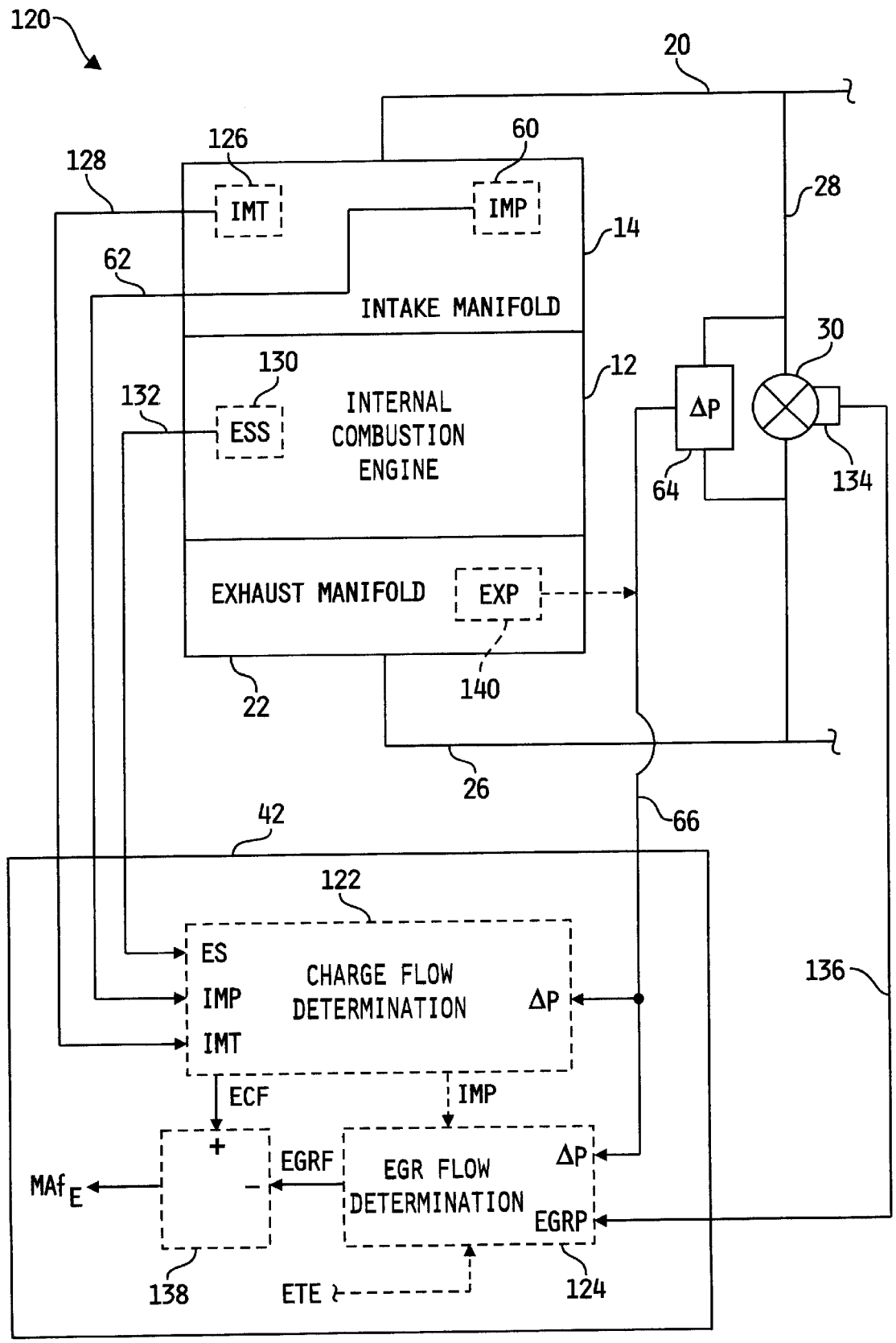
FIG. 3A is a diagrammatic illustration of one preferred embodiment of a system for estimating the mass flow of fresh air into the turbocharger compressor of FIG. 1.

As described briefly hereinabove, the present invention contemplates embodiments of system 10 of FIG. 1 wherein the mass air flow sensor 52 is omitted, and the engine controller 42 instead includes a control algorithm for estimating the mass of fresh air entering the inlet of the turbocharger compressor 16. Referring now to FIG. 3A, one preferred embodiment of a system 120 is shown including engine controller 42 configured for determining such a mass air flow estimate $MAF_E$. System 120 includes several components in common with system 10 of FIG. 1, and like numbers are therefore used to identify like components. For example, system 120 includes an internal combustion engine 12 having an intake manifold 14 fluidly coupled to a compressor 16 of a turbocharger 18 (not shown) via intake conduit 20, wherein conduit 20 receives fresh air via the turbocharger compressor. An exhaust manifold 22 of engine 12 expels exhaust gas to ambient via exhaust conduit 26, and an EGR valve 30 is preferably disposed in fluid communications with the intake and exhaust conduits 20 and 26 respectively via EGR conduit 28. A differential pressure (ΔP) sensor 64 is preferably positioned across the EGR valve 30 and has opposing inputs in fluid communication with EGR conduit 28 on either side of valve 30. Sensor 64 is electrically connected to an input of a charge flow determination block 122 and to an input of an EGR flow determination block 124 of engine controller 42 via signal path 66. An intake manifold pressure sensor 60 is connected to another input of the charge flow determination block 122 via signal path 62, and an engine speed sensor 130 of known construction is electrically connected to another input of block 122 via signal path 132.

An intake manifold temperature sensor (IMT) 126 is disposed in fluid communication with the intake manifold 14 of engine 12, and is electrically connected to another input of the charge flow determination block 122 of engine controller 42 via signal path 128. IMT sensor 126 is preferably a known sensor operable to produce a signal on signal path 128 corresponding to the temperature of charge flowing into the intake manifold 14, wherein the charge flowing into the intake manifold 14 is generally made up of fresh air supplied by the turbocharger compressor 16 combined with recirculated exhaust gas supplied by EGR valve 30. EGR valve 30 includes an EGR valve position sensor 134 of known construction and electrically connected to an EGR position input (EGRP) of the EGR flow determination block 124 via signal path 136. EGR valve position sensor 134 is operable, as is known in the art, to sense a position of the EGR valve relative to a predefined position and produce and EGR position signal on signal path 136 corresponding thereto. Optionally, as shown in phantom in FIG. 3A, system 120 may include an exhaust pressure sensor EXP 140 disposed in fluid communication with the exhaust manifold 22 (or exhaust conduit 26), wherein sensor 140 may be connected to signal path 66.

In one preferred embodiment, the charge flow determination block 122 of the engine controller 42 is operable to compute an estimate of the mass flow of charge (ECF) entering intake manifold 14 by first estimating the volumetric efficiency ($\eta$) of the charge intake system, and then computing ECF as a function of $\eta$ using a conventional speed/density equation. Any known technique for estimating $\eta$ may be used, and in one preferred embodiment of block 122 $\eta$ is computed according to a known Taylor mach number-based volumetric efficiency equation given as:

$$\eta = A_1 * \{(Bore/D)^{2} * (stroke*ES)^{B}/\sqrt{\gamma*R*IMT}*[(1+EXP/IMP)+A_2]\} + A_3 \quad (1),$$

where, $A_1$, $A_2$, $A_3$ and B are all calibratable parameters preferably fit to the volumetric efficiency equation based on mapped engine data, Bore is the intake valve bore length, D is the intake valve diameter, stroke is the piston stroke length, wherein Bore, D and stroke are generally dependent upon engine geometry, $\gamma$ and R are known constants ($\gamma*R=387.414$ KJ/kg/deg K), ES is engine speed, IMP is the intake manifold pressure, EP is the exhaust pressure, where EXP=IMP+ΔP, and IMT = intake manifold temperature.

In one preferred embodiment, From the foregoing equation, it should be apparent that system 120 may substitute an exhaust pressure sensor 140, as shown in phantom in FIG. 3A, for the ΔP sensor 64, although commercially available exhaust pressure sensors that are capable of withstanding harsh environments associated with the exhaust manifold 22 and/or exhaust conduit 26 are not typically available. For purposes of the present invention, a ΔP sensor 64 is therefore preferably used.

With the volumetric efficiency value $\eta$ estimated according to equation (1), the estimated charge flow value ECF is preferably computed according to the equation:

$$ECF = \eta * V_{DIS} * ES * IMP/(2*R*IMT) \quad (2),$$

where,

η is the estimated volumetric efficiency, $V_{DIS}$ is engine displacement and is generally dependent upon engine geometry, ES is engine speed, IMP is the intake manifold pressure, R is a known gas constant (R=54), and IMT is the intake manifold temperature.

Figure 3B:
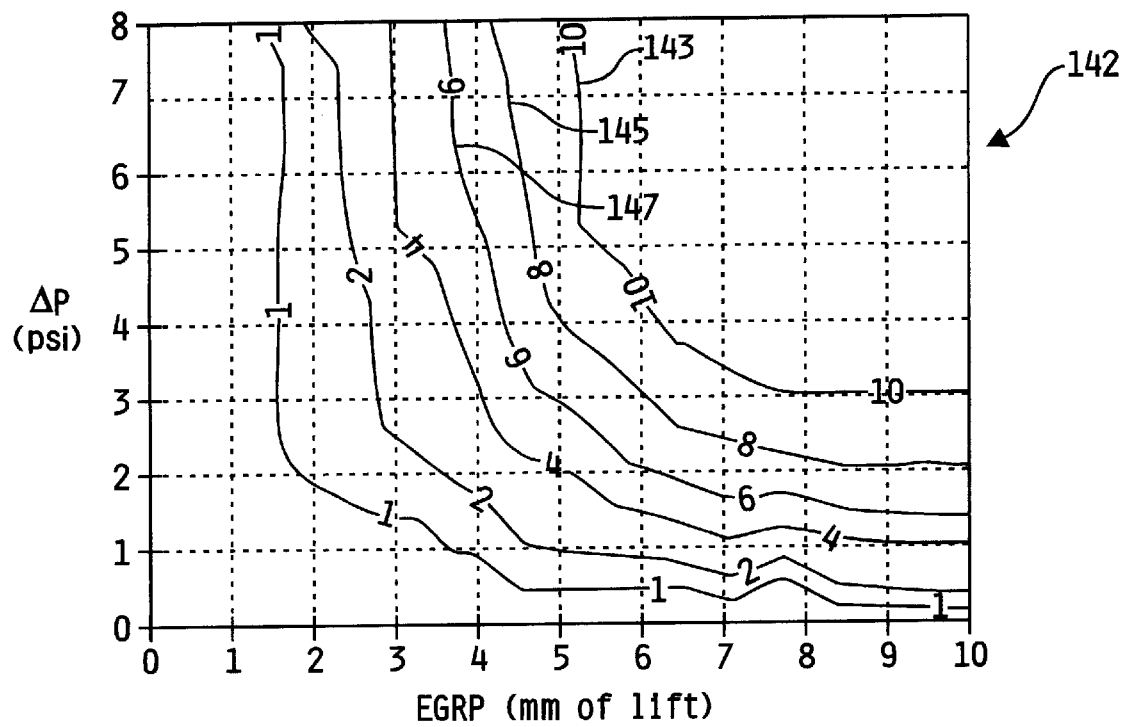
FIG. 3B is a plot of ΔP vs. EGR valve position illustrating one preferred embodiment of the EGR flow determination block of FIG. 3A.

Referring now to FIG. 3B, one preferred embodiment of the EGR flow determination block 124 of FIG. 3A is shown, wherein the flow estimation function of block 124 is illustrated in FIG. 3B as a plot 142 of ΔP (psi) vs. EGR valve position EGRP (mm of valve lift). Plotted against ΔP and EGRP are a number of constant EGR mass flow contours 143, 145, 147, etc. Block 124 is operable, in this embodiment, to select an appropriate EGR flow contour based on current values of ΔP and EGRP, or use known interpolation techniques to produce more accurate EGR mass flow estimates. Alternatively, the plot 142 illustrated in FIG. 3B may be provided in the form of a look-up table, as one or more equations relating ΔP and EGRP to EGR mass flow, or the like.

Figure 3C:
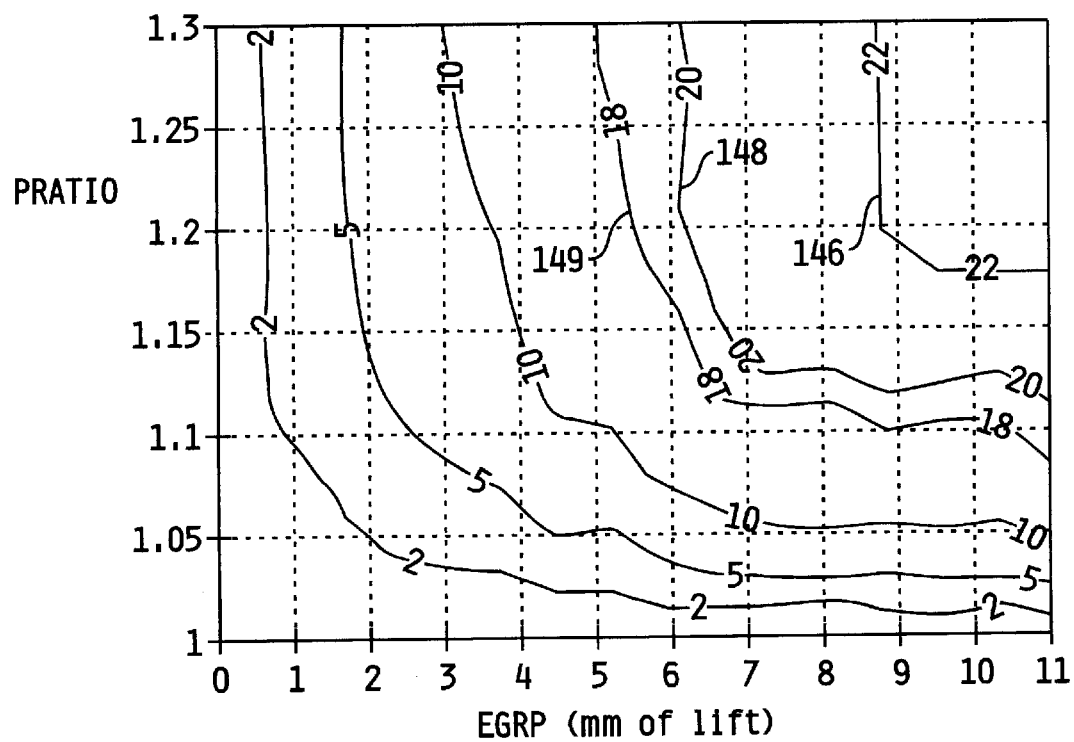
FIG. 3C is a plot of turbocharger compressor pressure ratio vs. EGR valve position illustrating an alternate embodiment of the EGR flow determination block of FIG. 3A.

Referring now to FIG. 3C, an alternate embodiment of the corrected EGR flow determination block 124 of FIG. 3A is shown, wherein part of the flow estimation function of block 124 is illustrated as a plot 144 of PRATIO (EXP/IMP) vs. EGR valve position EGRP (mm of valve lift), Plotted against PRATIO and EGRP are a number of constant EGR mass flow parameter contours 146, 148, 149, etc. Block 124 is preferably operable, in this embodiment, to select an appropriate EGR flow parameter contour based on current values of PRATIO and EGRP, or use known interpolation techniques to produce more accurate EGR mass flow parameter estimates. Alternatively, the plot 144 illustrated in FIG. 3C may be provided in the form of a look-up table, as one or more equations relating PRATIO and EGRP to appropriate EGR mass flow parameter values, or the like. In any case, engine controller 42 includes in this embodiment an engine exhaust estimation algorithm, such as that set forth in co-pending U.S. patent application Ser. No. 09/774,664, entitled SYSTEM FOR ESTIMATING ENGINE EXHAUST TEMPERATURE, which is assigned to the assignee of the present invention and the disclosure of which is incorporated herein by reference. The EGR flow determination block 124 is operable in this embodiment to receive the estimated engine exhaust temperature value (ETE) as well as the intake manifold pressure signal (IMP) as inputs thereto as shown in phantom in FIG. 3C, and compute the EGR flow estimate according to the equation:

$$EGRF = EXP * f(EGRP, PRATIO)/\sqrt{ETE} \quad (3),$$

wherein,

EXP is the exhaust pressure (EXP=IMP+ΔP),

ETE is the engine exhaust temperature estimate, and f(EGRP, PRATIO) is the function illustrated by the plot 144 of FIG. 3C.

Further details relating to the foregoing techniques for estimating EGR mass flow are provided in co-pending U.S. Patent Application Ser. No. 09/774,897, entitled SYSTEM AND METHOD FOR ESTIMATING EGR MASS FLOW AND EGR FRACTION, which is assigned to the assignee of the present invention, and the disclosure of which is incorporated herein by reference. In any case, the EGR flow determination block 124 is operable to produce an estimated EGR mass flow value (EGRF).

Engine controller 42 further includes an arithmetic block 138 having an addition input receiving the estimated charge flow value (ECF) and a subtraction input receiving the estimated EGR flow value (EGRF), and an output producing the estimated mass flow value ($MAF_E$) as a difference between ECF and EGRF. As described hereinabove, system 10 of FIG. 1 may in some embodiments omit the mass air flow sensor 52 an instead include blocks 122, 124 and 138 of FIG. 3A to estimate the mass of fresh air $MAF_E$) entering the inlet of the turbocharger compressor 16.

Based on conventional compressor flow dynamics, it is well known in the art that given any two of the following variables, the remaining two may be uniquely determined:

$$\frac{MAF\sqrt{CIT}}{CIP}, \quad \eta, \quad \frac{COP}{CIP}, \quad \frac{TS}{\sqrt{CIT}},$$

wherein,

MAF is the mass flow of air entering the inlet of the turbocharger compressor 16, CIT is the inlet temperature of the compressor 16, CIP is the inlet pressure of the compressor 16, COP is the pressure at the outlet of the turbocharger compressor, TS is the rotational speed of the turbocharger 18, η is the efficiency of the turbocharger 18, $$\frac{MAF\sqrt{CIT}}{CIP}$$

is the corrected mass flow value (referred to hereinafter as CMAF), $$\frac{COP}{CIP}$$

is the ratio of compressor outlet pressure and compressor inlet pressure (referred to hereinafter as PRATIO), and $$\frac{TS}{\sqrt{CIT}}$$

is the corrected turbocharger speed (referred to hereinafter as CTS).

In the above relationships, it is to be understood that the compressor outlet pressure COP is preferably computed as a difference between the intake manifold pressure signal (IMP) and the differential pressure signal (ΔP) across the EGR valve 30.

Assuming, for example, that CMAF and CTS are known, the PRATIO and η may be uniquely determined according to the functions:

$$PRATIO = f_1(CTS, CMAF), \quad \eta = f_2(CTS, CMAF) \quad (4).$$

The outlet temperature (COT) of the turbocharger compressor 16 may be estimated in accordance with the well known isentropic relation by the equation:

$$COT = (CIT/\eta) * [PRATIO^{(r-1)/r} - 1] + CIT \quad (5),$$

wherein "r" is the gas specific heat ratio. Dividing both sides of (5) by CIT and substituting equation (4) into equation (5) yields the equation:

$$COT/CIT = [1/f_2(CTS, CMAF)]*[f_1(CTS, CMAF)^{(r-1)/r} - 1] + 1 \quad (6),$$

which, if negligible compressor heat loss is assumed, yields the equation:

$$COT/CIT = f(CTS, CMAF) \quad (7).$$

Figure 4A:
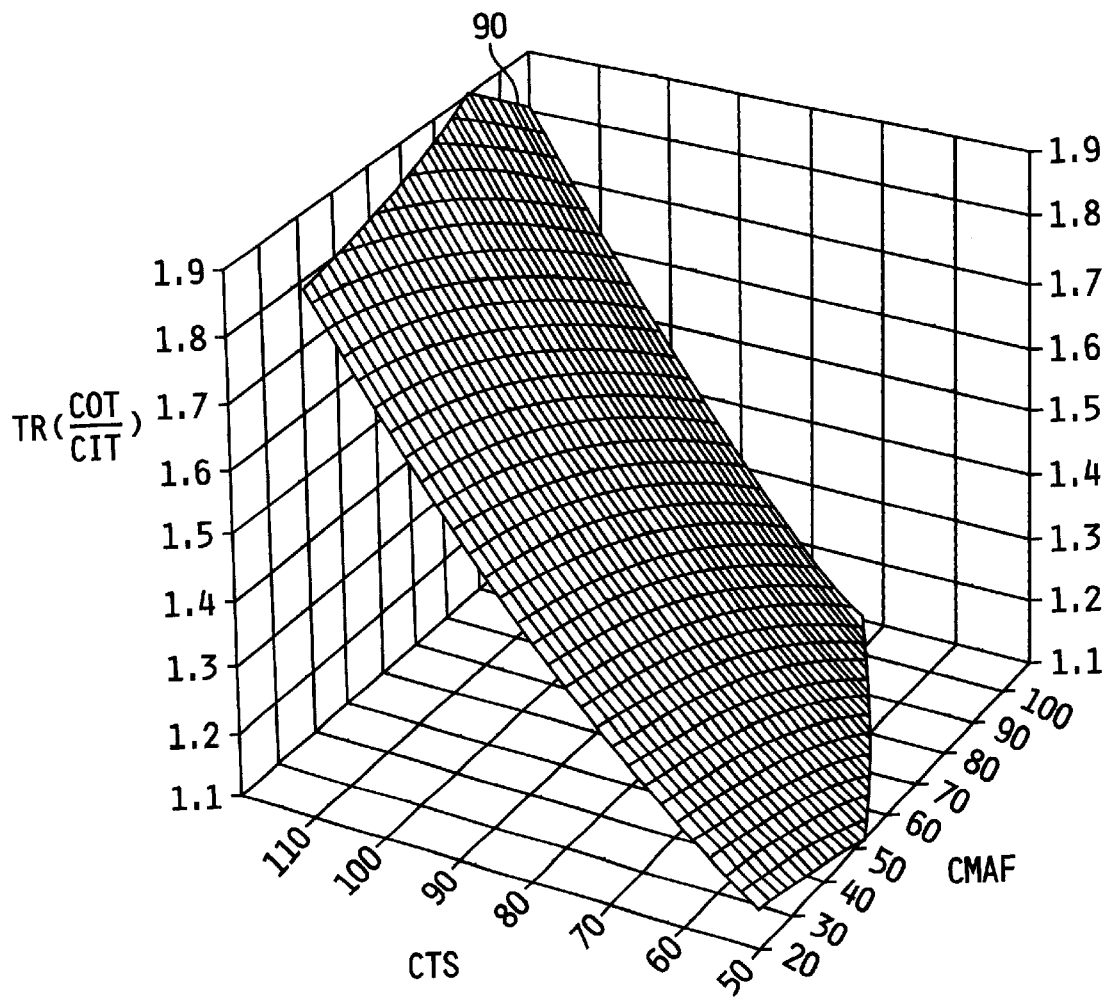
FIG. 4A is a 3-D plot illustrating one preferred technique for estimating compressor outlet temperature by mapping compressor temperature ratio to current values of corrected turbocharger speed and corrected fresh mass air flow, in accordance with the present invention.

Thus, the compressor temperature ratio (TR) defined as COT/CIT may be uniquely determined as a direct function of CTS and CMAF. Referring to FIG. 4A, a three dimensional plot 90 of TR, CTS and CMAF is illustrated for an example engine and air handling system implementation. For every given pair of CTS and CMAF, plot 90 illustrates that there exists a uniquely determined compressor temperature ratio TR.

Those skilled in the art will recognize that the foregoing analysis with respect to the derivations of equations (4)–(7) may easily be applied to other combinations of the compressor flow dynamics variables resulting in the following relationships:

$$COT/CIT = f(CTS, PRATIO) \quad (8),$$

and $$COT/CIT = f(PRATIO, CMAF) \quad (9).$$

Figure 4B:
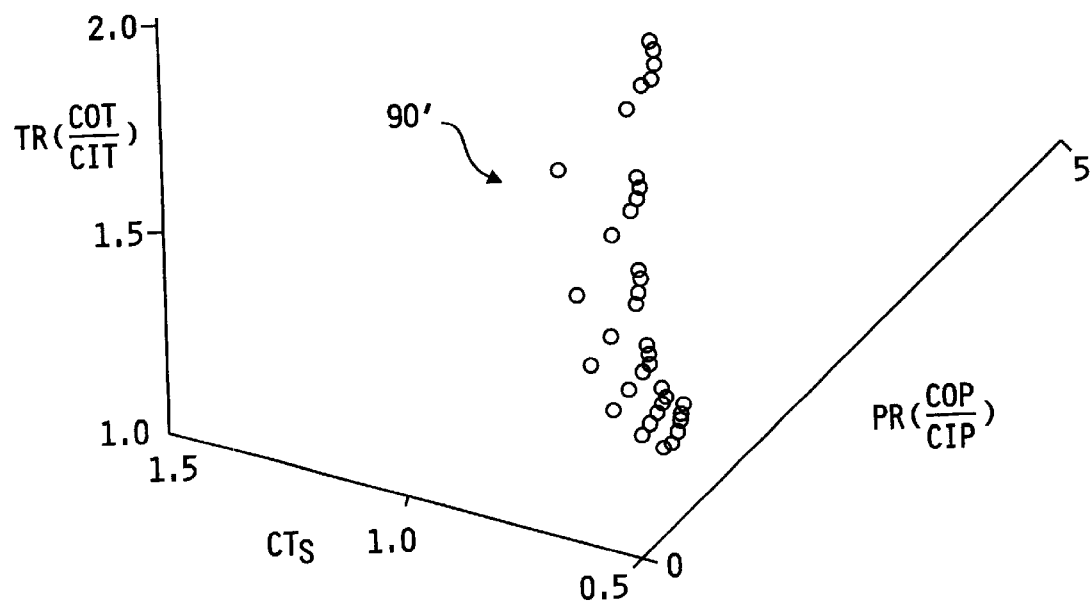
FIG. 4B is a 3-D plot illustrating an alternate technique for estimating compressor outlet temperature by mapping compressor temperature ratio to current values of corrected turbocharger speed and compressor pressure ratio, in accordance with the present invention.
Figure 4C:
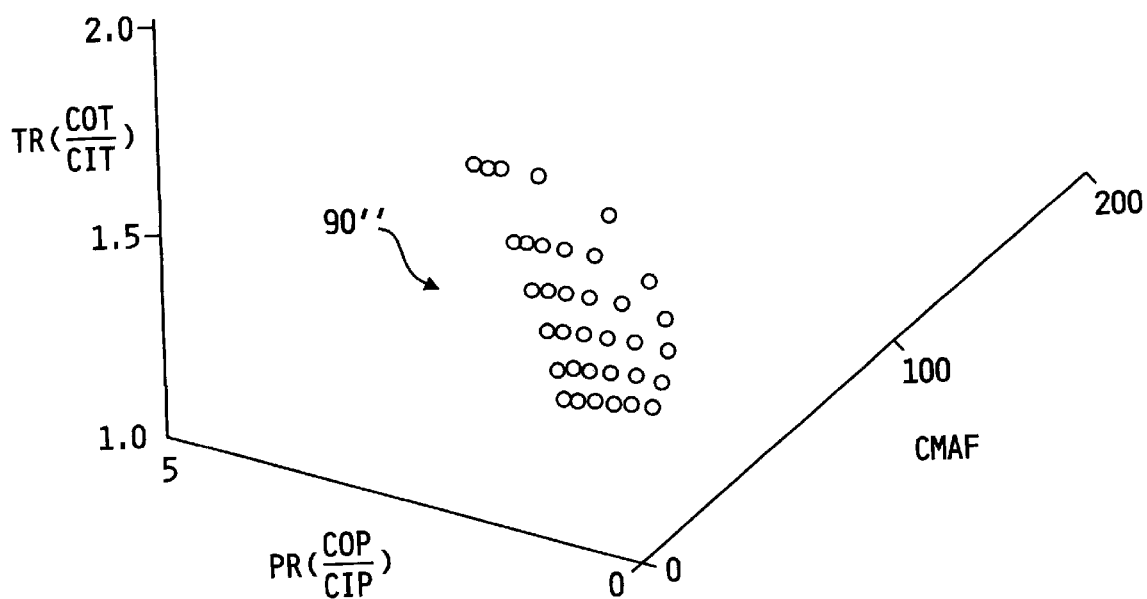
FIG. 4C is a 3-D plot illustrating another alternate technique for estimating compressor outlet temperature by mapping compressor temperature ratio to current values of compressor pressure ratio and corrected fresh mass air flow, in accordance with the present invention.

Referring to FIG. 4B, a three dimensional plot 90' of TR, CTS and PRATIO is illustrated for another example engine and air handling system implementation. For every given pair of CTS and PRATIO, plot 90' thus illustrates that there exists a uniquely determined compressor temperature ratio TR. Referring to FIG. 4C, a three dimensional plot 90''' of TR, PRATIO and CMAF is illustrated for another example engine and air handling system implementation. For every given pair of PRATIO and CMAF, plot 90''' thus illustrates that there exists a uniquely determined compressor temperature ratio TR.

The present invention contemplates a number of techniques for mapping the two known variables in any of the equations (7)–(9) to a corresponding compressor temperature ratio (TR) value. For example, in one preferred embodiment, the data in any one or more of FIGS. 4A–4C forms a two-dimensional table stored in memory 45, wherein estimation values in between data points may be obtained using known linear or non-linear interpolation techniques. In an alternate embodiment, the three-dimensional compressor temperature ratio map of any of FIGS. 4A–4C may be represented by a polynomial stored within memory 45, wherein such a polynomial is solved for TR given known values of the two remaining parameters. For example, plot 90 of FIG. 4A represents a smooth surface and can therefore be modeled as a second-order polynomial according to the equation:

$$COT/CIT = a + b*CTS + C*CTS^2 + d*CMAF + e*CMAF^2 + f*CTS*CMAF \quad (10),$$

wherein a, b, c, d, e and f represent model constants. In the map data represented in FIG. 4A, these model constants are identified as follows:

$$COT/CIT = 0.957 - 0.000485 CTS - 2.18e\text{-}5CTS^2 + 0.0009 CMAF + 7.3e\text{-}5CMAF^2 \quad (11).$$

Figure 5:
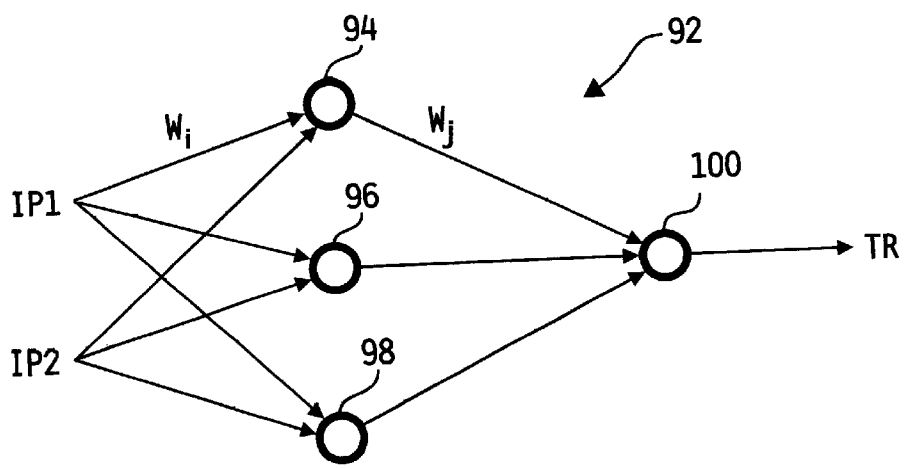
FIG. 5 is a diagrammatic illustration of one preferred embodiment of a neural network strategy for estimating compressor outlet temperature in accordance with any of the plots of FIGS. 4A–4C.

In yet another alternate embodiment, the three-dimensional compressor temperature ratio map of any of FIGS. 4A–4C may be modeled by a neural network trained as an appropriate surface for fitting the data points. For the plot 90 of FIG. 4A, for example, an appropriate neural network model 92 of this plot is illustrated in FIG. 5. Neural network 92 has two inputs IP1 and IP2 corresponding to the known variables (e.g., CTS and CMAP), four neurons 94, 96, 98 and 100, wherein each represents a tan sig function, and wherein the neural connections represent model weights. The input signals IP1 and IP2. are propagated through these weights, and the network 92 accurately computes the temperature ratio value TR based thereon.

Regardless of the technique used to estimate the temperature ratio TR, the compressor outlet temperature is easily determined therefrom according to the relationship:

$$COT = TR/CIT \quad (12).$$

Figure 6:
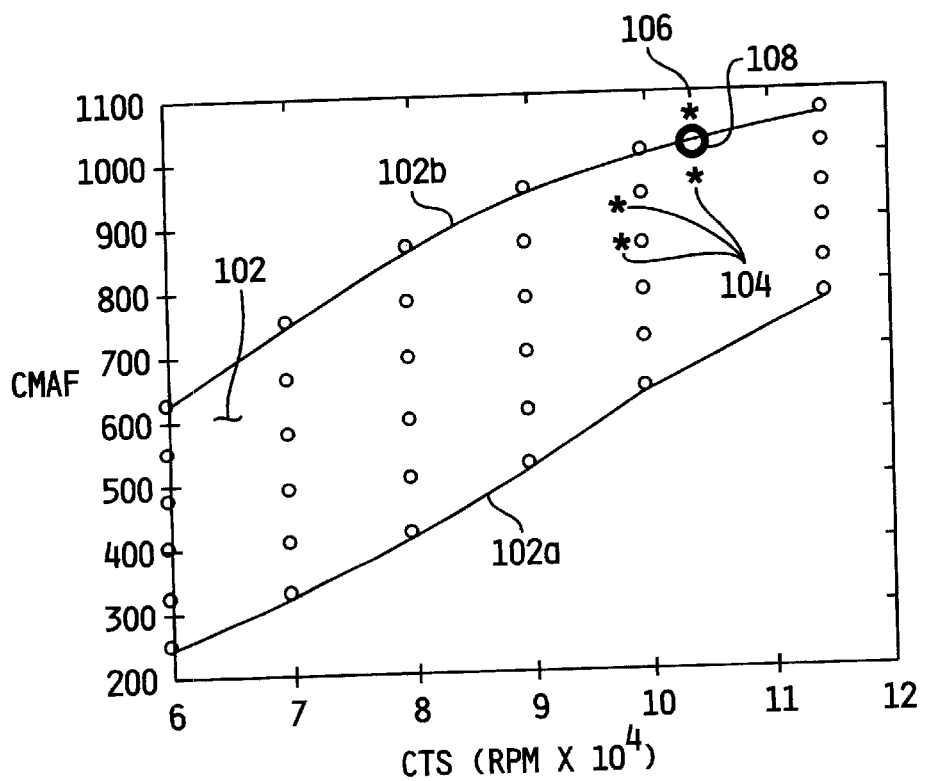
FIG. 6 is a 2-D plot of a portion of the 3-D plot of FIG. 4A illustrating one preferred technique for treating beyond-boundary operating conditions in estimating compressor outlet temperatures.

Using any of the temperature ratio estimation models just described, it is possible that the input variables to the compressor temperature ratio map of any of FIGS. 4A–4C may fall outside of the compressor map boundary. Referring to FIG. 6, for example, a two-dimensional slice of the compressor temperature ratio map of FIG. 4A is shown having CMAF and CTS boundaries 102a and 102b defining a compressor map region 102 therebetween. While input variables 104 lying within region 102 pose no problems for any of the estimation models of the present invention, input variable 106 lies outside of region 102 and therefore cannot be mapped to an appropriate temperature ratio value TR. In such cases, the model preferably defines the temperature ratio value based on a nearest boundary value to the outlying point. For example, in FIG. 6, the model preferably replaces the outlying point 106 with point 108 lying on the boundary 102b of region 102. The present invention contemplates using any known error minimization technique for appropriately locating an outlying point on a corresponding boundary 102a or 102b.

Figure 7:
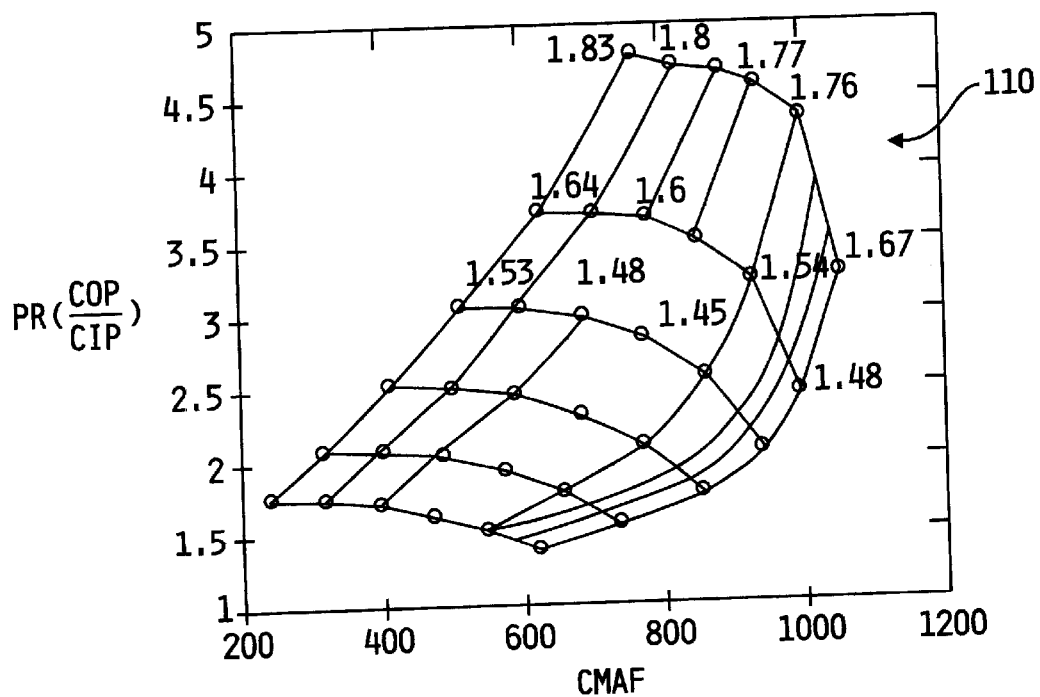
FIG. 7 is plot of turbocharger compressor ratio vs. corrected fresh mass air flow illustrating particular operating conditions affecting turbocharger compressor outlet temperature.

Referring now to FIG. 7, a conventional turbocharger compressor map 110, plotted against pressure ratio (COP/CIP) and CMAF, is shown. The more vertical lines represent lines of constant compressor efficiency, the more horizontal lines represent lines of constant turbocharger rotational speed, and the numbers superimposed thereon represent compressor temperature ratio values (TR). While lower mass air flow, lower engine speed, higher altitude and higher ambient temperature will generally increase the compressor temperature ratio, it can readily be seen from map 110 that compressor temperature ratio (TR) is strongly proportional to turbocharger rotational speed. In order to maintain the compressor outlet temperature below a desired limit, the engine controller 42 is therefore preferably configured to control turbocharger rotational speed.

Figure 8:
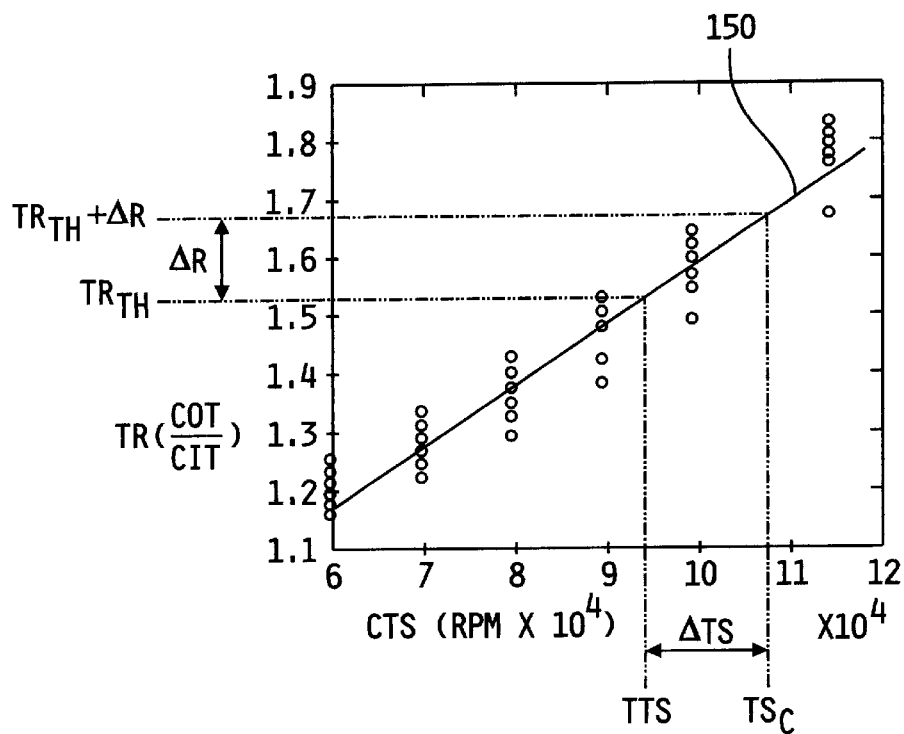
FIG. 8 is a 1-D plot of a portion of the 3-D plot of FIG. 4A illustrating the effect thereon of a turbocharger compressor outlet temperature in excess of a safe threshold compressor outlet temperature.
Figure 9:
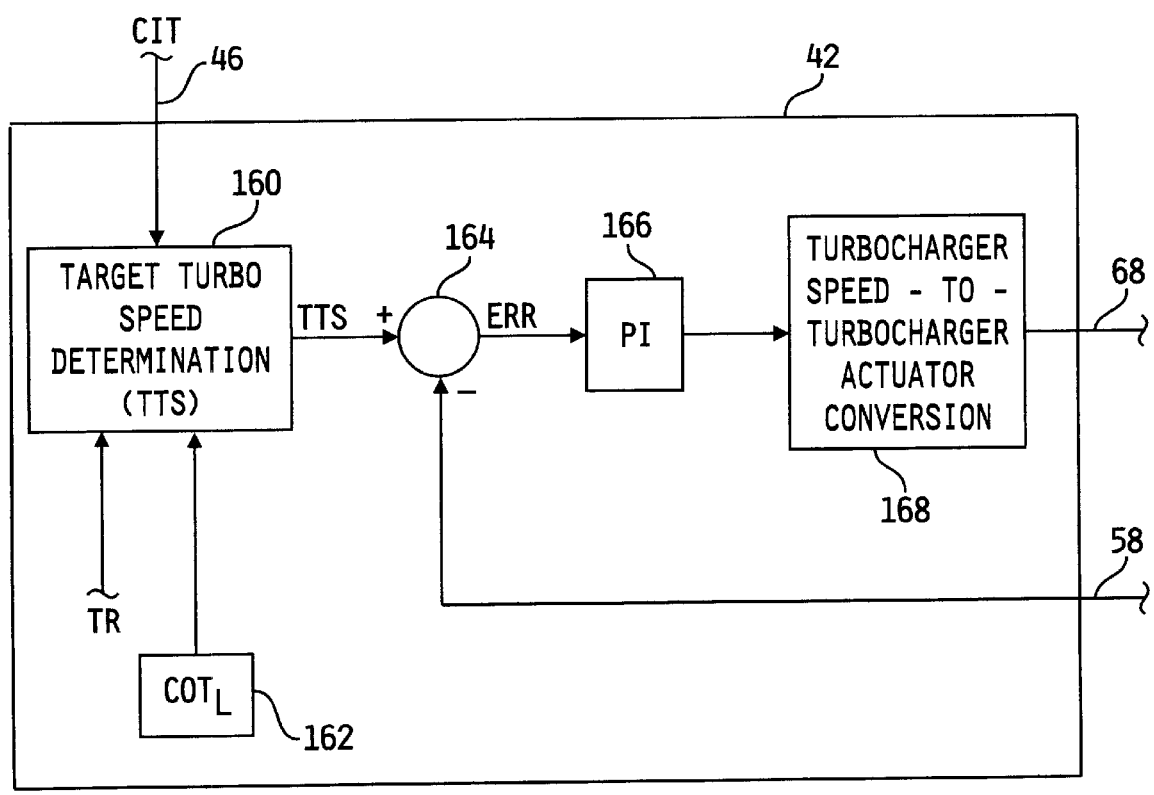
FIG. 9 is a diagrammatic illustration of one preferred embodiment of a turbocharger compressor outlet temperature control technique, in accordance with the present invention.

As is known in the art, turbocharger rotational speed is generally a function of the swallowing capacity of the turbocharger turbine 24 and of engine speed (via engine fueling). In accordance with the present invention, the outlet temperature of the turbocharger compressor 16 is preferably controlled by appropriately modifying the swallowing capacity of the turbine 24 to therefore control turbocharger rotational speed. Referring to FIGS. 8 and 9, one preferred turbocharger speed control technique for maintaining compressor outlet temperature (COT) below a desired temperature is shown. Referring first to FIG. 8, a one-dimensional plot 150 of the compressor temperature ratio map of FIG. 4A is shown wherein the temperature ratio threshold value $TR_{TH}$ corresponds to the temperature ratio defining the desired compressor outlet temperature limit ($COT_L$) and $TR_{TH} + \Delta R$ corresponds to the current operating point. In order to reduce the compressor outlet temperature to at least the desired compressor outlet temperature limit, the temperature ratio must accordingly be reduced by an amount equal to ΔR. With regard to turbocharger speed CTS, reducing the current COT value to the COT limit value requires reducing CTS from the current turbocharger speed value $TS_C$ to a target turbocharger speed TTS. According to plot 150, TTS may be approximated according to the equation:

$$TTS = \text{sqrt}(CIT) * (a * TR_{TH} + b) \quad (13),$$

wherein a and b are constants.

Referring now to FIG. 9, one preferred configuration of engine controller 42 including a control strategy for limiting the compressor outlet temperature to $COT_L$, in accordance with the present invention, is shown. In this embodiment, the engine controller 42 preferably includes a target turbocharger speed determination block 160 receiving the compressor inlet temperature signal (CIT) on signal path 46, a current compressor temperature ratio value (TR) via any of the techniques described hereinabove with respect to FIGS. 1–6 and the desired compressor outlet temperature limit $COT_L$ from block 162. It is to be understood that the compressor outlet temperature limit $COT_L$ either be a static value stored within block 162 or a dynamically changing value as a function of one or more engine operating conditions such as engine speed, mass air flow rate, ambient temperature, ambient pressure or the like. In any case, block 160 is preferably responsive to CIT, TR and $COT_L$ to determine the target turbocharger speed value TTS as a function thereof according to equation (13) above (wherein $TR_{TH} = COT_L/CIT$), and to provide TTS to an addition input of a summation block 164. Summation block 164 includes a subtraction input receiving the actual turbocharger speed signal on signal path 58, and an output of block 164 provides an error value ERR corresponding to a difference therebetween. This error value ERR is applied to a suitable controller 166, such as a PI controller, providing an output to a turbocharger speed-to-turbocharger actuator conversion block 168. Block 168 is, in turn, operable to provide a suitable turbocharger actuator control signal on signal path 68 for appropriately controlling the swallowing capacity of the turbocharger turbine 24 in order to reduce the turbocharger speed to TTS. By reducing the turbocharger speed to TTS, the compressor outlet temperature COT is limited to $COT_L$.

Figure 10:
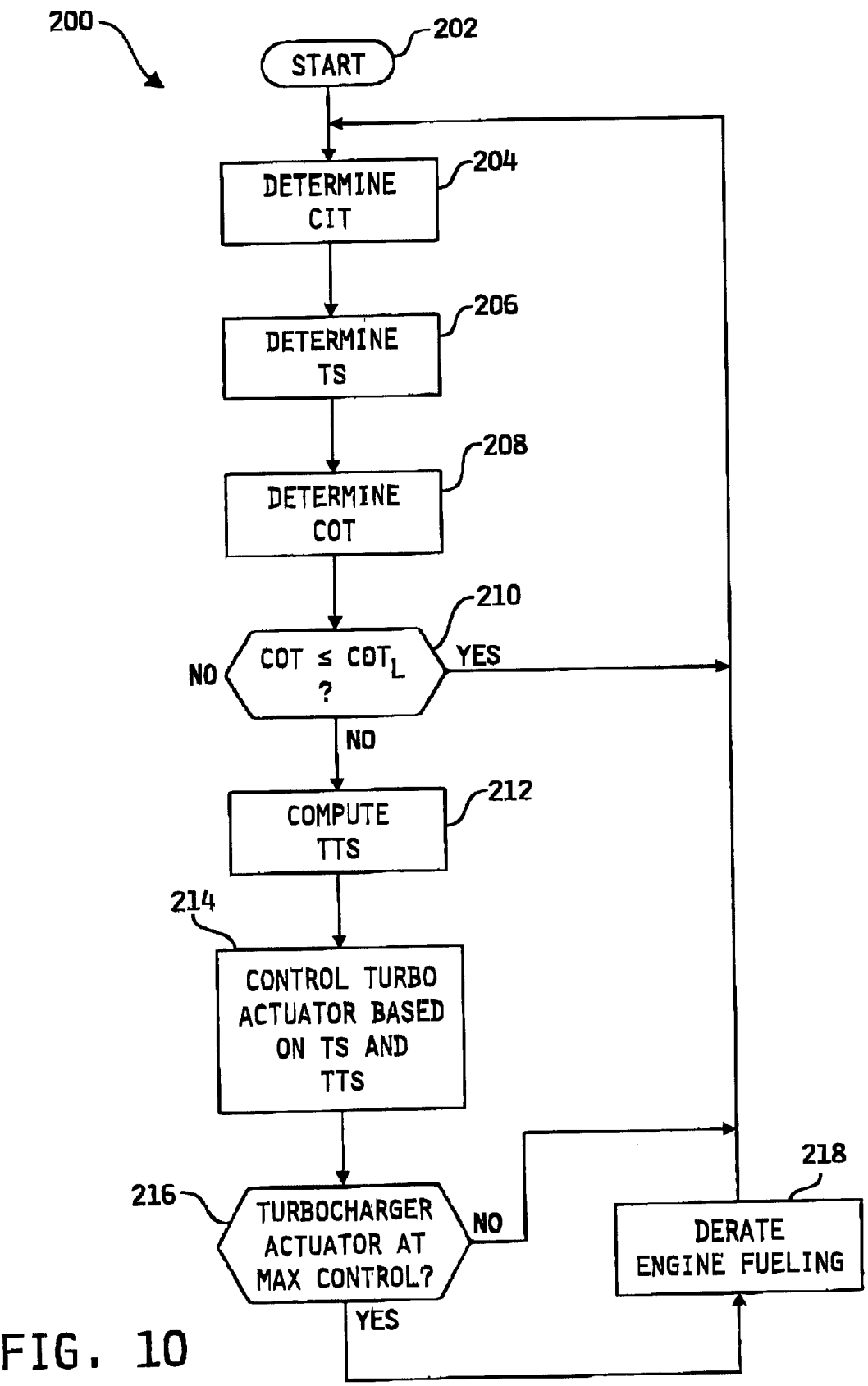
FIG. 10 is a flowchart illustrating one preferred embodiment of a software algorithm for controlling turbocharger compressor outlet temperature using the control strategy of FIG. 9, in accordance with the present invention.

Referring now to FIG. 10, one preferred embodiment of a software algorithm 200 for carrying out the control strategy of FIG. 9, in accordance with the present invention, is shown. Algorithm 200 is executed by engine controller 42 and begins at step 202. Thereafter at step 204, controller 42 is operable to determine the compressor inlet temperature (CIT), preferably by monitoring the compressor inlet temperature sensor 44. Thereafter at step 206, controller 42 is operable to determine turbocharger rotational speed (TS), preferably by monitoring the turbocharger speed sensor 56. Thereafter at step 208, controller 42 is operable to determine the compressor outlet temperature (COT), preferably in accordance with any of the techniques described hereinabove.

Following step 208, controller 42 is operable at step 210 to compare the compressor outlet temperature value (COT) with the desired compressor outlet temperature limit value ($COT_L$). If controller 42 determines at step 210 that COT is less than or equal to $COT_L$, algorithm 200 returns to step 204. If, however, controller 42 determines at step 210 that COT is greater than $COT_L$, algorithm 200 advances to step 212 where controller 42 is operable to compute a target turbocharger speed value (TTS), preferably in accordance with equation (13) above. Thereafter at step 214, controller 42 is operable to control any desired one or more of the turbocharger actuators described hereinabove with respect to FIGS. 2A–2C (e.g., variable geometry turbine 80, wastegate 82 and/or exhaust throttle 88) based on an error value representing a difference between TS and TTS. Thereafter at step 216, controller 42 is operable to determine whether the one or more turbocharger actuators is/are at their maximum controllable limit(s) in accordance with well-known techniques therefore. If controller 42 determines at step 216 that the one or more turbocharger actuators is/are at their maximum controllable limit(s), algorithm 200 advances to step 218 where controller 42 is operable to derate the fueling signal supplied to fueling system 72 in order to further decrease the compressor outlet temperature COT. If, on the other hand, controller 42 determines at step 216 that the one or more turbocharger actuators is/are not at their maximum controllable limit(s), algorithm 200 loops back to step 204.

Figure 11:
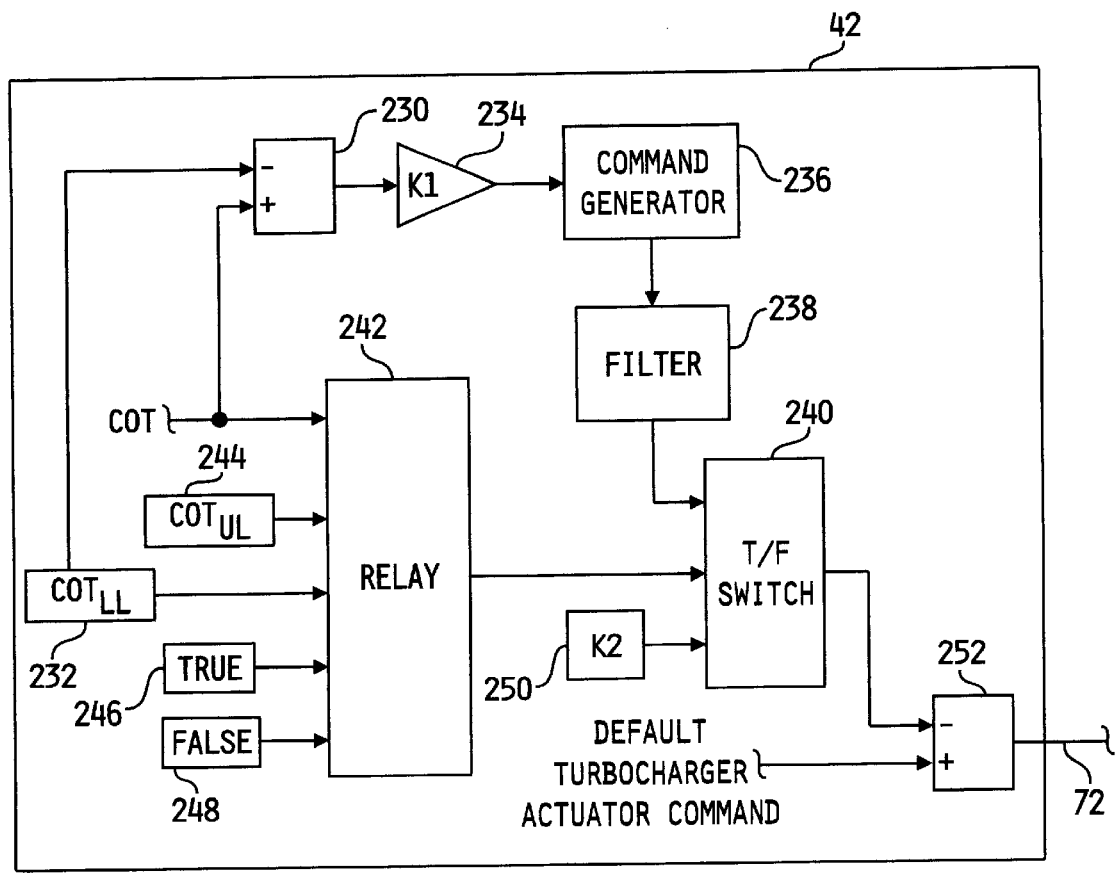
FIG. 11 is a diagrammatic illustration of an alternate embodiment of a turbocharger compressor outlet temperature control technique, in accordance with the present invention.

Referring now to FIG. 11 another preferred configuration of engine controller 42 including an alternate control strategy for limiting the compressor outlet temperature, in accordance with the present invention, is shown. In this embodiment, the engine controller 42 preferably includes an arithmetic block 230 having an addition input receiving the compressor outlet temperature COT and a subtraction input receiving a lower compressor outlet temperature limit $COT_{LL}$ from block 232. An output of block 230 produces an error value corresponding to the difference between COT and $COT_{LL}$, and provides this error value to a gain block 234 having a gain value K1 associated therewith. The output of gain block 234 is provided to a command generator 236 producing a supplemental turbocharger actuator command value that is supplied to a filter block 238. In one embodiment, filter block 238 represents a first-order, although other filter configurations are contemplated. In any case, the output of the filter block 238 is provided to a first input of a true/false switch 240.

The controller configuration illustrated in FIG. 11 further includes a relay block 242 having a first input receiving the COT value, a second input receiving the lower COT limit value $COT_{LL}$ from block 232 and a third input receiving an upper COT limit value $COT_{UL}$. An output of relay 242 is provided to a second input of true/false switch 240 having a third input receiving a constant value K2 (e.g., zero) from block 250. The output of switch 240 is provided to a subtraction input of an arithmetic block 252 having an addition input receiving an internally generated default turbocharger actuator command. The output of block 252 provides the turbocharger actuator control signal on signal path 68, and, represents a difference between the default turbocharger actuator command and the output of true/false switch 240.

In operation, the upper COT limit value $COT_{UL}$ is preferably set to a desired maximum compressor outlet temperature and the lower COT limit value $COT_{LL}$ is preferably set to some lower temperature value (e.g., 20 degrees less than $COT_{UL}$). As long as the current COT value is above $COT_{LL}$, the error value produced by block 230 will be greater than zero and the filter 238 will therefore produce a supplemental turbocharger actuator command. If the current COT value is above $COT_{UL}$, the output of relay 242 produces a "true" value and true/false switch 240 thus passes the output of filter 238 to block 252. If, on the other hand, the current COT value drops below $COT_{LL}$, relay 242 produces a "false" value and the true/false switch 242 is operable to pass the value of block 250 (e.g., zero) to block 252. Thus, if COT exceeds $COT_{UL}$, controller 42 is operable to subtract the supplemental turbocharger actuator command produced at the output of filter block 238 from the default turbocharger actuator command and produce this difference value on signal path 68. This continues until COT drops below $COT_{LL}$ at which time the relay switches to a "false" condition, wherein the output of true/false switch 240 switches to zero such that controller produces the default turbocharger actuator command on signal path 68. This controller configuration thus provides for programmable hysteresis threshold values $COT_{UL}$ and $COT_{LL}$ wherein COT is reduced when it rises above $COT_{UL}$ and is continued to be reduced until it drops below $COT_{LL}$.

Figure 12:
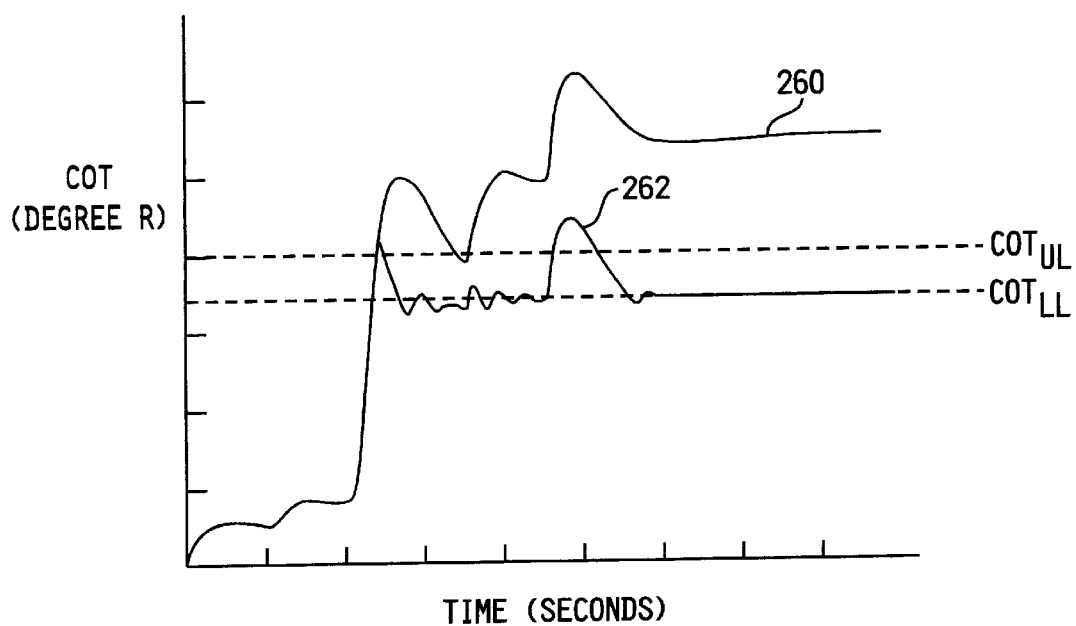
FIG. 12 is a plot comparing uncontrolled turbocharger compressor outlet temperature vs. controlled turbocharger compressor outlet temperature using the control technique illustrated in FIG. 11.

Referring to FIG. 12, a plot of COT vs. time is illustrated wherein waveform 260 represents COT in an uncontrolled environment. The COT waveform 262, by contrast, illustrates compressor outlet temperature control provided by the configuration of the engine controller 42 shown in FIG. 11 whereby COT is controlled between $COT_{UL}$ and $COT_{LL}$ with little overshoot.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A system for estimating turbocharger compressor outlet temperature, comprising:
    a turbocharger having a compressor defining a compressor inlet and a compressor outlet fluidly coupled to an intake manifold of an internal combustion engine;
    a turbocharger speed sensor producing a turbocharger speed signal indicative of turbocharger rotational speed;
    means for determining air pressure within said compressor outlet and producing a first pressure signal corresponding thereto;
    a compressor inlet pressure sensor sensing air pressure within said compressor inlet and producing a second pressure signal corresponding thereto;
    means for determining a mass flow of fresh air entering said compressor inlet and producing a mass air flow signal corresponding thereto; and
    a control circuit computing a pressure ratio as a ratio of said first and second pressure signals, said control circuit estimating a temperature of said compressor outlet as a function of any two of said turbocharger speed signal, said mass air flow signal and said pressure ratio.

2. The system of claim 1 further including a compressor inlet temperature sensor sensing a temperature of air entering said compressor inlet and producing a compressor inlet temperature signal corresponding thereto, said control circuit estimating said temperature of said compressor outlet further as a function of said compressor inlet temperature.

3. The system of claim 2 wherein said control circuit includes:
    means for determining a corrected turbocharger speed value as a function of said turbocharger speed signal and said compressor inlet temperature signal;
    means for determining a corrected mass air flow value as a function of said mass air flow signal, said compressor inlet temperature signal and said compressor inlet pressure; and
    means for estimating said temperature of said compressor outlet as a function of said compressor inlet temperature signal, said corrected turbocharger speed value and said corrected mass air flow value.

4. The system of claim 2 wherein said control circuit includes:
    means for determining a corrected turbocharger speed value as a function of said turbocharger speed signal and said compressor inlet temperature signal; and
    means for estimating said temperature of said compressor outlet as a function of said compressor inlet temperature signal, said corrected turbocharger speed value and said pressure ratio.

5. The system of claim 2 wherein said control circuit includes:
    means for determining a corrected mass air flow value as a function of said mass air flow signal, said compressor inlet temperature signal and said compressor inlet pressure; and
    means for estimating said temperature of said compressor outlet as a function of said compressor inlet temperature signal, said corrected mass air flow value and said pressure ratio.

6. A system for estimating turbocharger compressor outlet temperature, comprising:
    a turbocharger having a compressor defining a compressor inlet and a compressor outlet fluidly coupled to an intake manifold of an internal combustion engine;
    a turbocharger speed sensor producing a turbocharger speed signal indicative of turbocharger rotational speed;
    means for determining a mass flow of fresh air entering said compressor inlet and producing a mass air flow signal corresponding thereto; and
    a control circuit estimating a temperature of said compressor outlet as a function said turbocharger speed signal and said mass air flow signal.

7. The system of claim 6 further including a compressor inlet temperature sensor sensing a temperature of air entering said compressor inlet and producing a compressor inlet temperature signal corresponding thereto, said control circuit estimating said temperature of said compressor outlet further as a function of said compressor inlet temperature.

8. The system of claim 7 wherein said control circuit includes:
    means for determining a corrected turbocharger speed value as a function of said turbocharger speed signal and said compressor inlet temperature signal; and
    means for estimating said temperature of said compressor outlet as a function of said compressor inlet temperature signal, said corrected turbocharger speed value and said mass air flow value.

9. The system of claim 8 further including a compressor inlet pressure sensor sensing air pressure within said compressor inlet and producing a pressure signal corresponding thereto;
    and wherein said control circuit includes means for determining a corrected mass air flow value as a function of said mass air flow signal, said compressor inlet temperature signal and said pressure signal;
    and wherein said means for estimating said temperature of said compressor outlet includes means for estimating said temperature of said compressor outlet as a function of said corrected turbocharger speed value, said corrected mass air flow value and said compressor inlet temperature signal.

10. A system for estimating turbocharger compressor outlet temperature, comprising:

a turbocharger having a compressor defining a compressor inlet and a compressor outlet fluidly coupled to an intake manifold of an internal combustion engine;

a turbocharger speed sensor producing a turbocharger speed signal indicative of turbocharger rotational speed;

means for determining air pressure within said compressor outlet and producing a first pressure signal corresponding thereto;

a compressor inlet pressure sensor sensing air pressure within said compressor inlet and producing a second pressure signal corresponding thereto; and a control circuit computing a pressure ratio as a ratio of said first and second pressure signals, said control circuit estimating a temperature of said compressor outlet as a function of said turbocharger speed signal and said pressure ratio.

11. The system of claim 10 further including a compressor inlet temperature sensor sensing a temperature of air entering said compressor inlet and producing a compressor inlet temperature signal corresponding thereto, said control circuit estimating said temperature of said compressor outlet further as a function of said compressor inlet temperature.

12. The system of claim 11 wherein said control circuit includes:

means for determining a corrected turbocharger speed value as a function of said turbocharger speed signal and said compressor inlet temperature signal; and means for estimating said temperature of said compressor outlet as a function of said compressor inlet temperature signal, said corrected turbocharger speed value and said pressure ratio.

13. A system for estimating turbocharger compressor outlet temperature, comprising:

a turbocharger having a compressor defining a compressor inlet and a compressor outlet fluidly coupled to an intake manifold of an internal combustion engine;

means for determining a mass of fresh air entering said compressor inlet and producing a mass air flow signal corresponding thereto;

means for determining air pressure within said compressor outlet and producing a first pressure signal corresponding thereto;

a compressor inlet pressure sensor sensing air pressure within said compressor inlet and producing a second pressure signal corresponding thereto; and a control circuit computing a pressure ratio as a ratio of said first and second pressure signals, said control circuit estimating a temperature of said compressor outlet as a function of said mass air flow signal and said pressure ratio.

14. The system of claim 13 further including a compressor inlet temperature sensor sensing a temperature of air entering said compressor inlet and producing a compressor inlet temperature signal corresponding thereto, said control circuit estimating said temperature of said compressor outlet further as a function of said compressor inlet temperature.

15. The system of claim 14 further including a compressor inlet pressure sensor sensing air pressure within said compressor inlet and producing a pressure signal corresponding thereto;

and wherein said control circuit includes:

means for determining a corrected mass air flow value as a function of said mass air flow signal, said compressor inlet temperature signal and said pressure signal; and means for estimating said temperature of said compressor outlet as a function of said corrected mass air flow value, said pressure ratio and said compressor inlet temperature signal.

16. A method of estimating turbocharger compressor outlet temperature, comprising the steps of:

determining a rotational speed of a turbocharger for an internal combustion engine;

determining a mass air flow corresponding to a mass flow of fresh air entering a compressor inlet of said turbocharger; and estimating a temperature of a compressor outlet of said turbocharger as a function of said rotational speed and said mass air flow.

17. The method of claim 16 further including the step of determining a compressor inlet temperature corresponding to a temperature of air entering said compressor inlet;

and wherein the estimating step includes estimating said temperature of said compressor outlet further as a function of said compressor inlet temperature.

18. The method of claim 17 further including the step of determining a compressor inlet pressure corresponding to air pressure within said compressor inlet;

and wherein the estimating step includes estimating said temperature of said compressor outlet further as a function of said compressor inlet pressure.

19. A method of estimating turbocharger compressor outlet temperature, comprising the steps of:

determining a rotational speed of a turbocharger for an internal combustion engine;

determining a compressor outlet pressure corresponding to air pressure within a compressor outlet of said turbocharger;

determining a compressor inlet pressure corresponding to air pressure within a compressor inlet of said turbocharger; and estimating a temperature of said compressor outlet as a function of said rotational speed, said compressor inlet pressure and said compressor outlet pressure.

20. The method of claim 19 further including the step of determining a compressor inlet temperature corresponding to a temperature of air entering said compressor inlet;

and wherein the estimating step includes estimating said temperature of said compressor outlet further as a function of said compressor inlet temperature.

21. A method of estimating turbocharger compressor outlet temperature, comprising the steps of:

determining a mass air flow corresponding to a mass flow of fresh air entering a compressor inlet of a turbocharger for an internal combustion engine;

determining a compressor inlet pressure corresponding to air pressure within said compressor inlet;

determining a compressor outlet pressure corresponding to air pressure within a compressor outlet of said turbocharger; and estimating a temperature of said compressor outlet as a function of said mass air, said compressor inlet pressure and said compressor outlet pressure.

22. The method of claim 21 further including the step of determining a compressor inlet temperature corresponding to a temperature of air entering said compressor inlet;

and wherein the estimating step includes estimating said temperature of said compressor outlet further as a function of said compressor inlet temperature.

* * * * *